J. TOMLINSON.
CARD PRINTING AND ENVELOP ADDRESSING MACHINE.
APPLICATION FILED OCT. 22, 1915.

1,281,098.

Patented Oct. 8, 1918.
8 SHEETS—SHEET 5.

Witnesses:
GA Pauberschmidt
A. J. Crane

Inventor:
Joseph Tomlinson
By Brown, Nissen & Sprinkle
Attys

J. TOMLINSON.
CARD PRINTING AND ENVELOP ADDRESSING MACHINE.
APPLICATION FILED OCT. 22, 1915.

1,281,098.

Patented Oct. 8, 1918.
8 SHEETS—SHEET 6.

Inventor:
Joseph Tomlinson

UNITED STATES PATENT OFFICE.

JOSEPH TOMLINSON, OF CHICAGO, ILLINOIS, ASSIGNOR TO COX MULTI-MAILER CO., OF CHICAGO, ILLINOIS, A CORPORATION OF MAINE.

CARD-PRINTING AND ENVELOP-ADDRESSING MACHINE.

1,281,098.    Specification of Letters Patent.    Patented Oct. 8, 1918.

Application filed October 22, 1915. Serial No. 57,222.

*To all whom it may concern:*

Be it known that I, JOSEPH TOMLINSON, a citizen of the United States, residing in Chicago, in the county of Cook and State of Illinois, have invented certain new and useful Card-Printing and Envelop-Addressing Machines, of which the following is a specification.

This invention relates to a machine for writing names and addresses, or other matter, on cards, envelops and whatever material it may be desirable to use in connection with such a machine. The invention consists substantially in the combination and arrangement hereinafter described, illustrated in the accompanying drawings and more particularly set forth in the appended claims.

Figure 2:
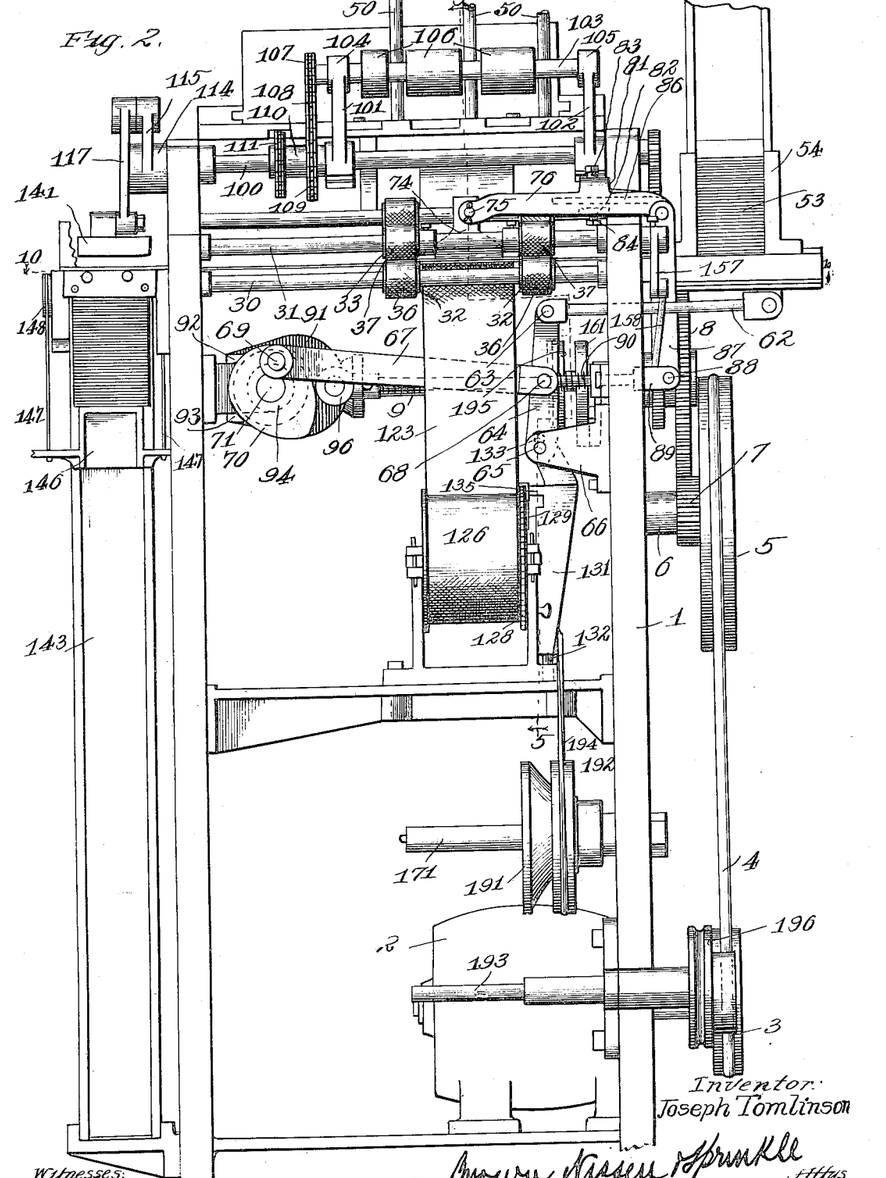
Fig. 2 is a front elevation of the machine shown in Fig. 1.
Figures 5, 6:
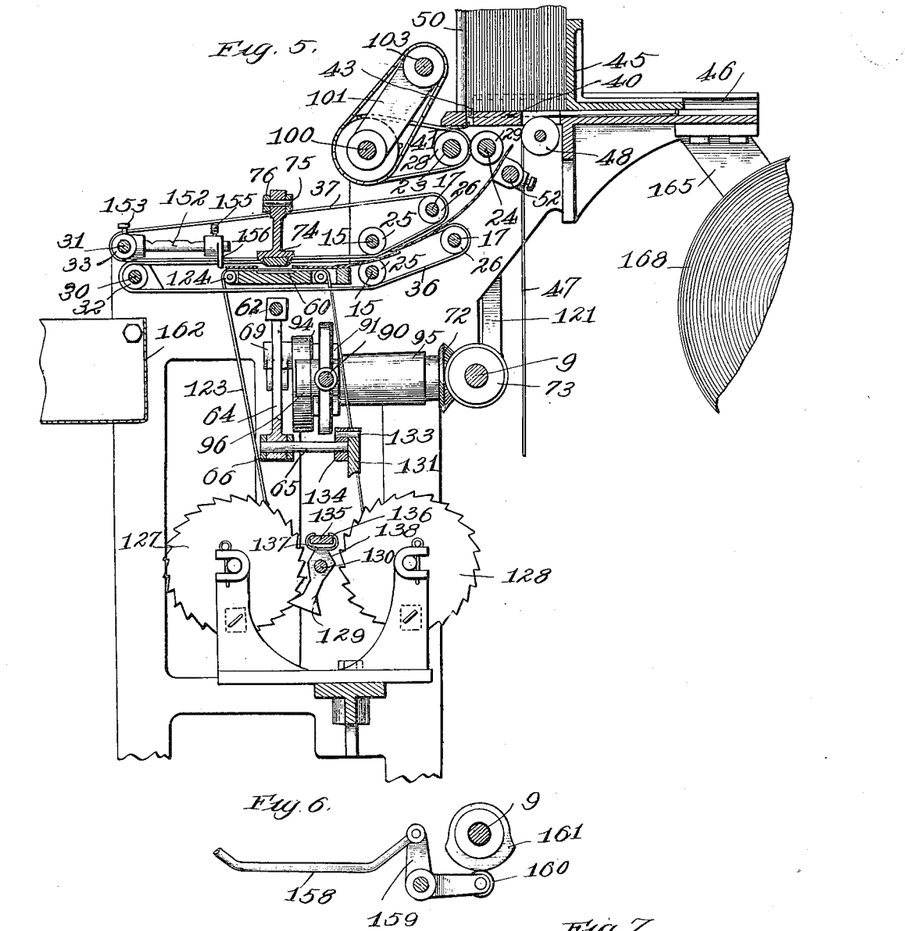
Fig. 5 is a fragmentary sectional view substantially on line 5—5 of Fig. 2.
Fig. 6 is a fragmentary sectional view on line 6—6 of Fig. 10.
Figure 7:
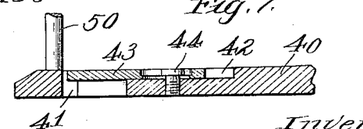
Fig. 7 is a fragmentary sectional view on line 7—7 of Fig. 1.
Figure 8:
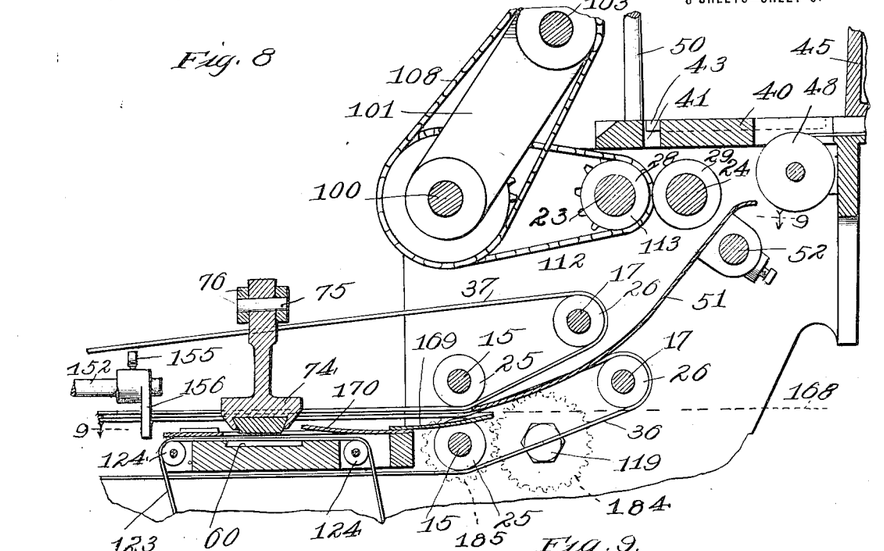
Fig. 8 is a fragmentary vertical sectional view of the machine showing the impression foot in section.
Figure 9:
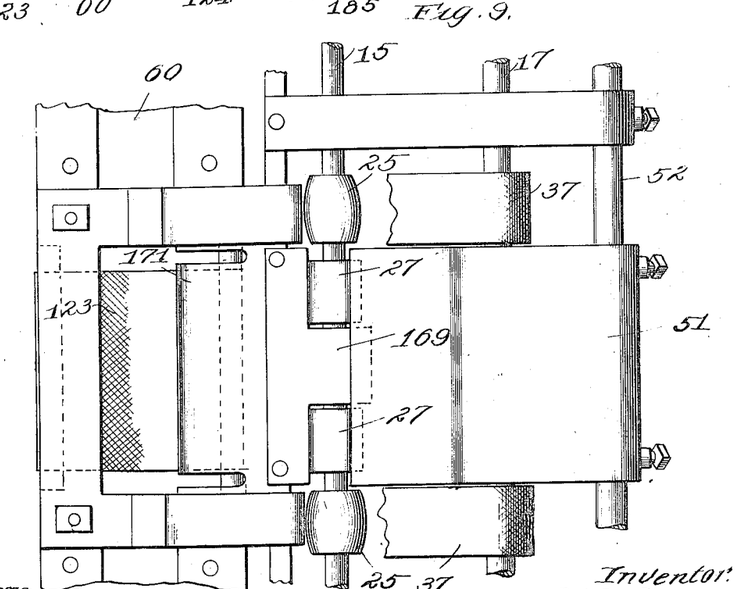
Fig. 9 is a horizontal sectional view on line 9—9 of Fig. 8.

The various operating parts of the addressing machine which constitute the embodiment of the invention shown by way of illustration in the accompanying drawings, are supported by a frame-work designated by the numeral 1. This frame-work carries near the base thereof a motor 2 having a pulley wheel 3 attached to the shaft thereof and connected by a belt 4 to a pulley wheel 5 (Figs. 2 and 3), from which power is transmitted to the moving parts. The pulley 5 is carried on a stud shaft 6 and has a pinion 7 attached thereto for rotation therewith. The pinion 7 meshes with the gear wheel 8 which is rigidly secured to the main drive shaft 9. The shaft 9 carries a pinion 10 at the end adjacent the gear 8 in position to mesh with an idler pinion 11 which in turns drives a second idler 12 mounted on a stud shaft 13 and held in place by a cotter pin 14 in a manner to permit easy removal of the idler 12 from its shaft. A pair of feed roller shafts 15 is driven from the idler 12 by means of the pinions 16, and a second pair of feed roller shafts 17 is driven from the same idler by means of the pinions 18. Connecting with the upper pinion 18 and driven thereby is a series of pinions 19, 20, and 21 driving the feed roller shafts 22, 23, and 24 respectively. The shafts 15 and 17 extend transversely across the machine and are provided with belt pulleys 25 and 26 respectively (see Fig. 8). The shafts 15 are also provided with paper moving rolls 27, shown best in Fig. 9. The shafts 23 and 24 are provided with rolls 28 and 29 of rubber or similar material for a purpose to be described. A pair of shafts 30 and 31 extend transversely across the front portion of the machine, as shown in Figs. 2 and 5, and carry belt pulleys 32 and 33 respectively which are free to rotate on the shaft. The machine is provided with an upper and a lower set of endless feed belts, the lower belts 36 extending from the pulleys 26 on the shaft 17 over pulleys 25 on the shaft 15 and over pulleys 32 on the shaft 30. In a similar manner the belts 37 extend around the pulleys 26 on the upper shaft 17 with the lower run passing beneath the pulleys 25 on the upper shaft 15 and around the pulleys 33 on the shaft 31. When the machine is in operation, the upper run of the belt 36 and the lower run of the belt 37 travel to the left, as shown in Figs. 5 and 8, as they feed the paper forward to the printing apparatus.

Figure 1:
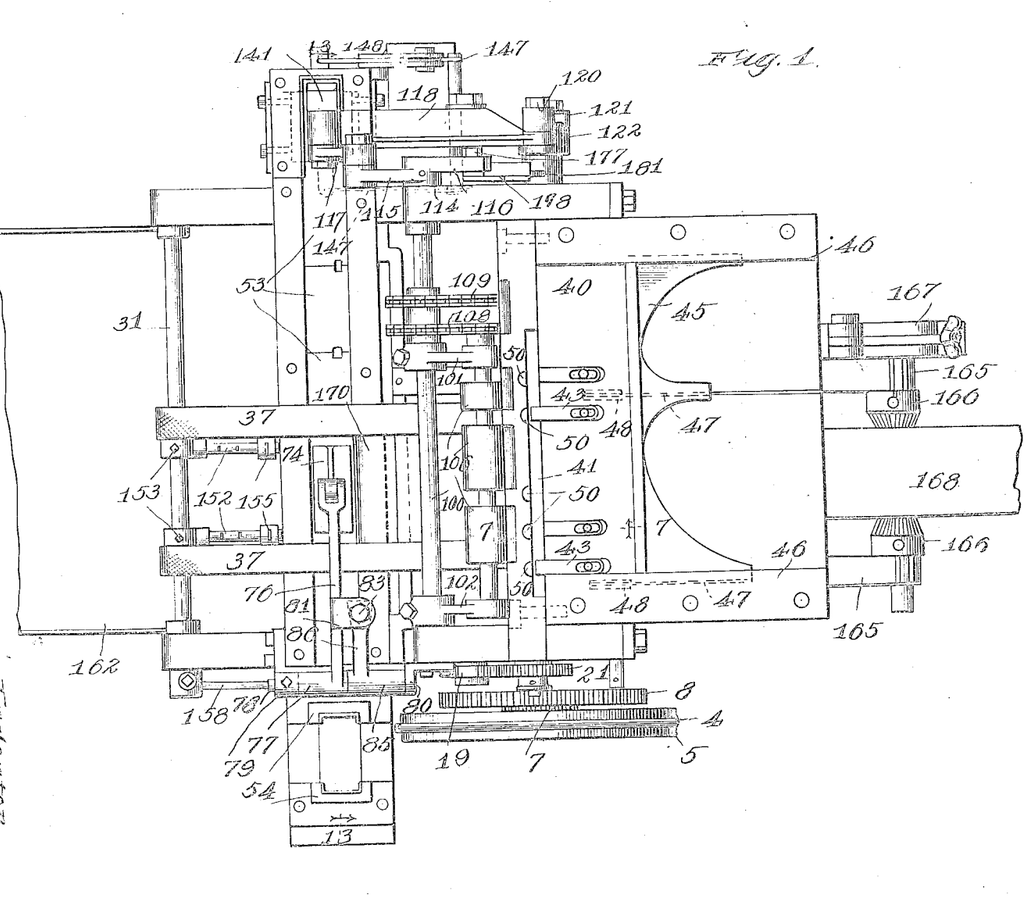
Figure 1 is a top plan view of an addressing machine constructed according to the present invention.
Figure 3:
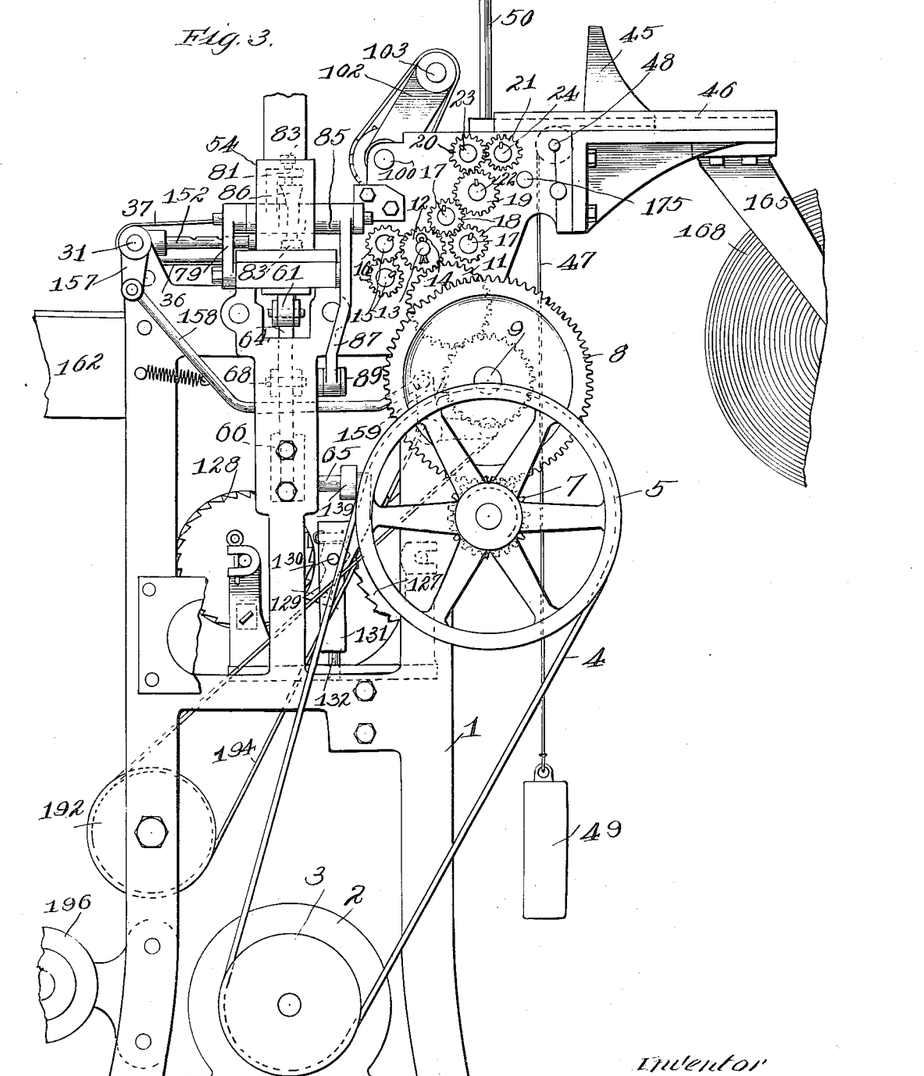
Fig. 3 is a side elevation looking toward the left in Fig. 2.

When envelops or cards are being supplied to the feeding mechanism above described, they are placed on edge in a vertical position on the plate 40. At the front edge of the plate 40 (as shown in Figs. 1, 5, 7 and 8) is a vertical opening or slot 41, through which the cards or envelops are fed. Adjustably secured in slots 42 in the upper front portion of the plate 40, are a number of bars or slides 43 arranged to project over the edge of the slot 41 for the purpose of regulating the effective width thereof in order that the device may be adjusted to permit but a single card or envelop to pass through the slot at one time. In setting the slides 43 for a given set of cards, a gage of a thickness very slightly exceeding the thickness of the cards to be printed, is placed in front of the slides 43 and the slides moved forward into contact with the gage, in which position they are rigidly clamped by means of screws 44. Follower 45 is mounted to slide horizontally on the upper surface of the plate 40 to move the cards forwardly into position to pass through the slot 41. This follower is held in position by guide bars 46 and is subjected to a continuous forward strain by means of cords 47 secured to the rear portion of the follower and passing over guide pulleys 48, as shown in Figs. 1, 3 and 5. The lower ends of the cords 47 are secured to weights 49 which supply the force for urging the follower 45 forwardly. A series of upright bars 50 is positioned at the forward edge of the slot 41 to check the forward movement of the cards and to properly position the forward card for movement through this slot. As the cards move downwardly one by one through the slot 41, they are caught between rollers 28 and 29 and fed downwardly onto and along a guide 51 adjustably secured to the cross shaft 52 and into position to be caught between the feed belts 36 and 37. A special device is provided for moving the forward cards down in succession, as will be later explained.

The printing operation in the present invention is performed by means of plates having the matter intended to be printed, such as names and addresses, stamped thereon in raised or embossed letters. These plates are made of thin metal and are designated in Fig. 1 by the reference character 53.

Figures 13, 14, 15, 16, 17:
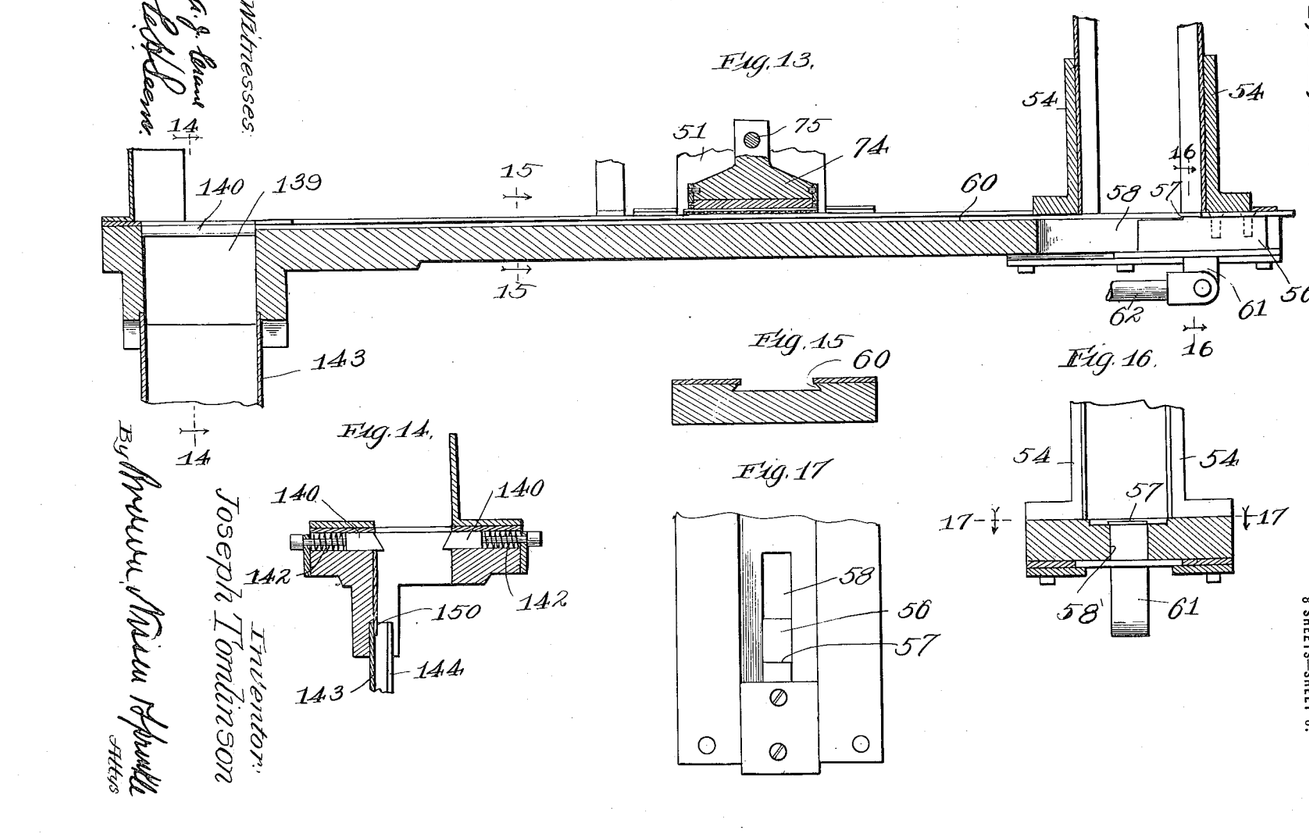
Fig. 13 is a fragmentary vertical sectional view of the stencil runway and associated parts.
Fig. 14 is a detail sectional view on line 14—14 of Fig. 13.
Fig. 15 is a section on line 15—15 of Fig. 13.
Fig. 16 is a section on line 16—16 of Fig. 13.
Fig. 17 is a fragmentary top plan view on line 17—17 of Fig. 16.

These printing plates 53 are supplied to the machine from a magazine 54, shown in the upper right hand portion of Figs. 2 and 13. The printing plates are placed in horizontal position upon one another and feed downwardly by gravity to the bottom of the magazine. A reciprocating ejector block 56 is mounted for reciprocatory movement below the magazine 54, and is provided with a shoulder 57 arranged to engage the outer end of the lowermost printing plate in the magazine. As will be understood from Figs. 16 and 17, the shoulder portion 57 of the ejector block 56, projects upwardly through a slot 58 in the floor of the magazine, and when the ejector 56 is moved forwardly, or to the left, as shown in Fig. 13, the lowermost printing plate will be carried with it away from the magazine and into the runway 60, shown best in Fig. 15. The ejector is arranged to move at each reciprocation a distance equal to the length of one printing plate, so that each forward movement of the ejector will carry the lowermost plate in the magazine a sufficient distance forwardly to permit the next higher plate to drop downwardly on the return of the ejector block into a position directly behind the plate just moved. In this way, the lowermost plates are fed one at a time from the magazine and form a continuous train extending the entire length of the runway across the front portion of the machine, each plate having its forward end directly abutting the plate immediately in front of it and pushing the plate in front forwardly at each movement of the ejector block.

Figures 10, 11, 12:
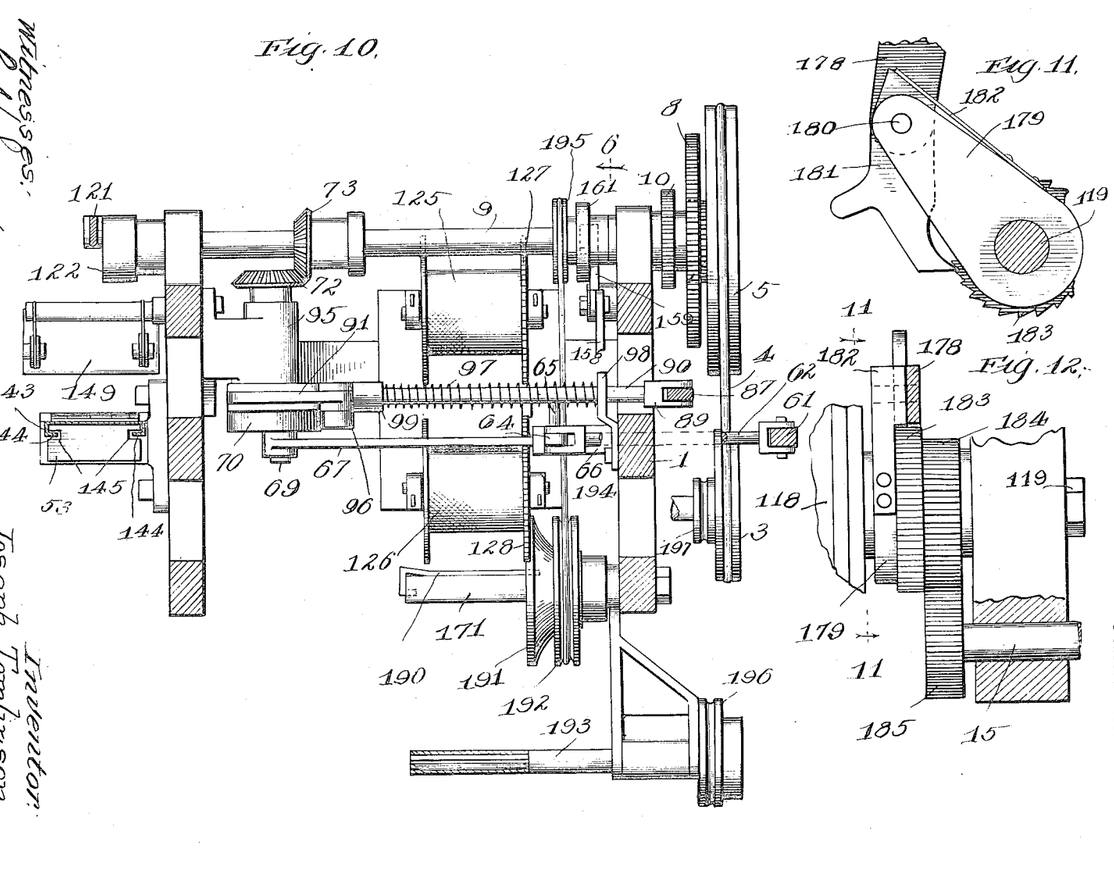
Fig. 10 is a horizontal sectional view on line 10—10 of Fig. 2.
Fig. 11 is a fragmentary sectional view on line 11—11 of Fig. 12.
Fig. 12 is a fragmentary top plan view with parts in section of the ratchet mechanism and associated parts shown in Fig. 11.

The mechanism for reciprocating the ejector block 56 is best understood from Figs. 2, 10 and 13. A lug 61 projects downwardly from the block 56 and has a bar 62 pivotally secured thereto. The other end of the bar 62 is pivoted at 63 to a lever 64 pivotally mounted by means of a shaft 65 in a bracket 66 carried on the frame 1. A link 67 is pivoted to the lever 64 at a point 68 intermediate the pivots 63 and 65. The end of the link 67 opposite the pivot 68 is mounted on a crank pin 69 carried by a crank disk and cam 70 which is rigidly secured on the end of the cross shaft 71 (shown in Figs. 2 and 10). The opposite end of the cross shaft 71 is provided with a miter gear 72 which meshes with a miter 73 mounted on the drive shaft 9. In this way a reciprocatory motion is imparted to the ejector plate 56 whenever the drive shaft 9 is rotated.

Centrally mounted over the runway 60 for vertical reciprocatory movement, is an impression foot 74 (shown in Figs. 1, 2, 5, 8, and 13). As will be seen from Figs. 1 and 2, the impression foot 74 is carried by a pivot 75 at the end of the lever 76 which has a sleeve 77 at the opposite end thereof mounted for pivotal movement on the circular bar 78. The bar 78 is rigidly held in the brackets 79 and 80 (Fig. 1) and the lever 76 is provided with laterally projecting lugs 81 and 82 having adjustable set screws 83 and 84 respectively. A second sleeve 85 is pivotally mounted on the rod 78 and carries an arm 86 which has its end positioned between the points of the set screws 83 and 84. The sleeve 85 has secured to the lower portion thereof, a downwardly projecting arm 87 (Figs. 2 and 3) which is pivoted at its lower end at 88 to an end bracket 89 on the rod 90. The opposite end of the rod 90 is provided with a guide fork 91 having the prongs 92 and 93 thereof arranged to bear on the upper and lower portion respectively, of a projection 94 carried by the bracket 95 in which the shaft 71 is mounted. Secured to one lateral face of the guide fork 91, is a cam roller 96 positioned to coöperate with the surface of the cam 70. A coil spring 97 surrounds the bar 90 and bears at one end against a bracket 98 carried on the frame 1 and at the opposite end against the shoulder 99 of the forked guide 91. This spring 97 resiliently holds the forked guide 91 in position with the cam roller 96 in active contact with the cam 70 and it will be apparent that rotation of the shaft 71 will periodically force the rod 90 to the right in Figs. 2 and 10, and that the rod will be returned by the spring 97 after each movement due to the cam 70. From Figs. 2 and 3, it will be seen that this reciprocation of the rod 90 will oscillate the bell crank lever composed of the arms 86 and 87, and the sleeve 85 and the arm 86 will in turn impart a vertical reciprocation to the bar 76 and the impression foot 74.

Mounted on a shaft 100 extending transversely across the upper portion of the machine (as shown in Figs. 1, 2, 5 and 8) is a frame consisting of two arms 101 and 102 rigidly secured to the shaft 100 and a shaft 103 mounted for rotation in bearings 104 and 105 on the arms 101 and 102 respectively. A series of rollers 106 is carried by the shaft 103 and so spaced thereon as to leave openings between the rollers opposite the upright bars 50, as shown in Fig. 2. The shaft 103 is rotated by a sprocket wheel 107 driven by a chain 108 from sprocket wheel 109 secured to a sleeve 110 mounted on the shaft 100. The sleeve 110 carries a second sprocket wheel 111 which is driven by a chain 112 from the sprocket wheel 113 mounted on shaft 23 (Fig. 8). By this arrangement the shaft 103 may be rotated from the shaft 23 independently of its angular position relative to the shaft 100. Rigidly secured to the end of the shaft 100 is a collar 114 which carries a pair of arms 115 and 116. Pivotally connected to the end of the arm 115 is a link 117 (Figs. 2 and 4), to the lower end of which is pivotally connected one end of a bracket 118. The bracket 118 is mounted for free oscillation on the end of the stud shaft 119. The other end of the bracket 118 carries a pivot 120 having the end of the pitman bar 121 carried thereon. The bar 121 is driven by the crank disk 122 secured to the end of the main drive shaft 9 for rotation therewith. By this mechanism, rotation of the drive shaft 9 imparts an oscillatory movement to the frame carrying the feed rolls 106, so that the rolls are periodically moved forward into position to bear against the forward card carried upon the plate 40 and force the card downwardly through the opening 41 into contact with the rollers 28 and 29, from whence it is carried by the belts 36 and 37 into position beneath the impression foot 74.

Figure 4:
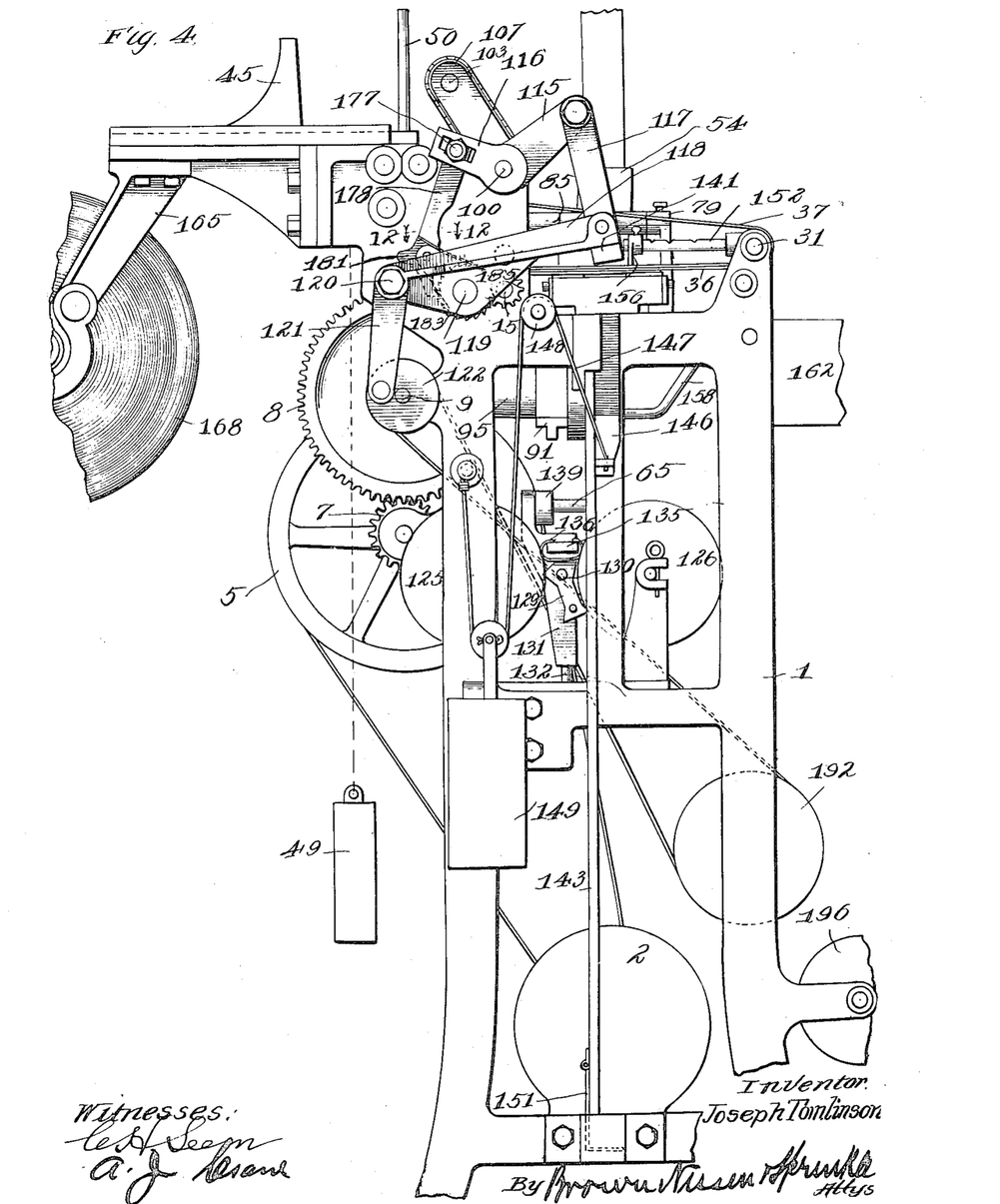
Fig. 4 is a side elevation looking toward the right in Fig. 2.

In order to make an impression upon the cards, as they are fed over the printing plates and beneath the impression foot, an impression ribbon 123 is arranged to pass over the guide-way 60 which carries the printing plates, and beneath the cards as they are fed into printing position, as shown in Fig. 8. The ribbon 123 passes over guide rollers 124 positioned at each side of the plate guide 60 and from these rollers the ribbon passes downwardly to ribbon spools 125 and 126. Each ribbon spool is provided with a ratchet wheel 127 and 128 respectively (Figs. 5 and 10). To wind the ribbon upon the ribbon spools, a pawl 129 is arranged to be alternately moved into position to coöperate with the ratchet wheels 127 and 128. This pawl is carried by a pivot 130 mounted on a bracket member 131 which has a guide pin 132 at its lower end adapted to reciprocate in an opening in the frame of the machine, as shown in Fig. 4. The upper end of the bracket 131 is carried on a pivot 133 projecting from the crank disk 134 (Figs. 2, 4 and 5), the crank disk 134 being secured to the end of the shaft 65 mounted in the bracket 66 and to which shaft the lever 64 is rigidly secured, as previously explained. As the shaft 65 oscillates under the action of the lever 64, an oscillatory movement is imparted to the crank disk 134 which in this way imparts a vertical reciprocation to the bracket 131 and hence to the pawl 130. The pawl 130 in turn transmits a stepped movement to the ribbon spool ratchet wheel with which it is in contact. A laterally projecting lug 135 is carried by the bracket 131 and this lug in turn carries a spring 136 arranged to coöperate with the flattened surfaces 137 and 138 respectively on the upper end of the pawl 129, to hold the pawl in operative relation with the ratchet wheels 127 and 128. By this mechanism the impression ribbon is moved forwardly a short distance after each impression is taken, and a fresh portion of the ribbon is thus presented to the printing plate at each operation. When the entire ribbon has been wound upon one of the spools, the position of the pawl 129 is reversed by hand and the ribbon re-wound in the opposite direction.

After the printing plates have passed the impression position, they move to the left along the guideway 60 (shown in Fig. 13) to a delivery chute 139 at the extreme left of the machine. The upper end of this delivery chute is provided with spring pressed detents 140 (shown in Fig. 14). When a printing plate reaches a position above the delivery chute, it is temporarily held from passing downwardly into the chute by means of these detents. Carried directly over the opening in the upper end of the chute, is a delivery foot 141 (Figs. 1, 2 and 4). This delivery foot is rigidly secured to the end of the bracket 118 and as this bracket is oscillated in a manner previously described, the delivery foot is periodically moved downward into position to press a printing plate resting upon the detents 140 downwardly past the detents into the opening of the chute, the detents moving backwardly against the pressure of spiral springs 142 to permit the passage of the printing plate. A delivery galley 143 is positioned directly below the delivery chute 139 in position to receive the printing plates as they are fed downwardly through the chute. As shown in Fig. 10, the galley 143 is provided with overhanging edges 144 arranged to enter notches 145 in the ends of the printing plates 53 to hold the printing plates in position in the galley. A lowering table 146 (Figs. 2 and 4) is mounted to slide vertically in the galley 143 and is yieldingly pressed upwardly by cords 147 passing over pulleys 148 and having a weight 149 arranged to exert a yielding tension upon the cords. By means of this table the plates in the galley and delivery chute are yieldingly held at the upper end of the chute with the uppermost plate pressing against the detents 140. It will be seen that as each new plate is forced into the delivery chute the plates already in the chute are moved downwardly against the pressure exerted by the weight 149 a sufficient distance to admit the newly inserted plate. The upper end of the galley 143 is held in position in the delivery chute by a plate 150 which projects over the back wall of the galley. When it is desired to remove the plates in the galley, the latch 151 at the lower end thereof is released, the lowering table 146 is moved out of the way to permit the plates in the chute to pass downwardly into the galley and the galley is then moved downwardly a short distance to free its upper end from the retaining plate 150, after which the galley with the plates held therein may be entirely removed from the machine. If it is desired, the entire galley with the plates therein may be raised to the upper end of the magazine 54 and the plates discharged into the magazine to be used again.

In order that the cards or envelops that are being printed may be fed forwardly into the proper position to receive the impression, and held in this position during the printing operation, it is necessary to provide stops for positioning the cards while they are being printed. For carrying such stops, the shaft 31, which extends laterally across the front portion of the machine, is provided with inwardly projecting rods or arms 152 secured to the shaft by set screws 153 (see Figs. 1, 4 and 5). Adjustably mounted on the arms 152 by means of set screws 155, are downwardly projecting fingers 156. These fingers may be moved longitudinally of the arms 152 to accommodate cards or envelops of different widths. As shown in Fig. 3, the end of the shaft 31 has secured thereto a crank arm 157 and the end of this arm is connected to a rod 158 which extends backwardly to a bell crank lever 159, as shown in Figs. 3 and 6. The bell crank lever 159 has a cam roller 160 adapted to bear on a cam 161 carried on the main drive shaft 9. It will be apparent from the shape of the cam shown in Fig. 6, that the bell crank lever 159 is held in one position through substantially half a revolution of the shaft 9 and in another position during the remainder of the revolution of the shaft. This oscillatory movement of the bell crank lever is transmitted to the shaft 31 and by it to the fingers 156 which are thereby alternately held in a lower position to intercept forward movement of the cards that are being fed to the machine, and in an upper position to permit the cards to be discharged after they have been printed. The parts are so proportioned that the fingers are held in the lower position while a card is being moved into position beneath the impression foot 74, and while the foot is moved downwardly to impress upon the card the matter embossed upon the printing plate which happens to be at that time beneath the impression foot. After the impression has been made and while the foot is in its upper position, the fingers 156 are moved upwardly to permit the card to be carried onward by the belts 36 and 37 and discharged into a basket 162 mounted on the frame in position to receive the cards.

From the description of the machine as thus far given, it is thought that its operation for printing different addresses on a series of cards or envelops, will now be understood. The printing plates, each with a different address embossed thereon, are placed in the magazine 54 and the cards or envelops to be printed are placed on edge upon the plate 40, the bars 43 having been previously set to permit the passage of a single card at a time through the slot 41. As the main drive shaft 9 is rotated by the motor 2, the frame carrying the feed rollers 106 is rocked into position to contact with the card at the upper forward edge of the plate 40 and force it downwardly through the slot 41 into contact with the rollers 28 and 29 which in turn move it into position to be engaged by the belts 36 and 37 and fed forwardly into position beneath the impression foot 74. As the card is passing from the plate 40 to the impression position, other cards are fed into position directly behind it, so that cards will be continuously moved into position beneath the impression foot. At the same time that the cards are being fed to the machine, the ejector 56 is oscillated in the manner described and the printing plates are moved along the guide 60 in continuous succession, the proportions of the parts being such that for each intermission between movements of the plates, one plate will be properly positioned to coöperate with the impression foot 74. For each movement of the feed rollers there is one reciprocation of the plate ejector 56 and also of the impression foot 74. In this way, for each card fed to the machine, a separate printing plate is moved into position to impress the address thereon upon the card, and the impression foot is given one operation to effect this impression. The stop fingers 156 are also given one oscillation for each movement of the feed rollers properly timed with relation to the movement of the other parts, to hold the card or envelop against the forward movement of the feed belts a sufficient length of time to receive an impression. The delivery foot 141 is also operated once for each operation of the other parts, so that the printing plates are moved out of the slideway at the proper time to accommodate other plates that are being fed thereto. In this way the machine operates continuously to impress different addresses one after another upon a series of cards or envelops in very rapid succession.

Before starting the operation of printing a series of addresses, it is usually desirable to make a proof of the addresses to be printed. This proof is made upon a continuous roll of paper carried on brackets 165 supported at the upper rear portion of the machine. The paper roll is supported on studs 166 removably carried in the brackets 165 and an adjustable brake 167 (Fig. 1) is provided for controlling the unwinding of the paper from the roll. When proof is being taken, the paper is drawn forwardly from the roll along the broken line 168 (Fig. 8), beneath the guide 51 and over the guide plates 169 and 170. It will be noted that the guide plate 170 is curved upward slightly at its end to resiliently hold the cards or envelops upwardly away from the impression ribbon 123 except when they are pressed downwardly by the impression foot 74. The proof paper need be only wide enough to receive the addresses, and is considerably narrower than the envelops or cards printed upon the machine. The width of the paper is such that it passes through the machine in a position between the belts and is not engaged by these belts. It also passes between the stop fingers 156 and thence over the shaft 30 and downwardly to a proof-winding spindle 171. During the taking of proof, the basket 162 is removed that it may not interfere with the downward run of the proof paper. Since the proof paper does not contact with the feed belts, other means must of course be provided for feeding the paper forward. This is done by the rolls 27 on the shafts 15. It will be seen from Fig. 9 that the guide plate 169 is cut away to permit the rolls 27 to extend upwardly therethrough to contact with the paper being fed to the machine. These rolls 27 during the process of addressing cards or envelops, are rotated sufficiently rapidly to feed the entire width of an envelop for each oscillation of the impression foot 74. It is not necessary nor desirable that a similar amount of proof paper be fed to the machine for each address printed, but the addresses may be placed much closer together on the proof. Arrangement is therefore made for operating the shafts 15 much more slowly during the taking of proof. To do this, the idler pinion 12 (Fig. 3) is removed from the pin 13 and may be placed upon a stud 175 provided for the purpose of holding it while proof is being taken. The removal of this idler pinion disconnects all of the feed rolls from the source of power as imparted to them through the gear train shown in Fig. 3. The feed shafts 15, however, are operated by mechanism at the opposite end of the shaft 9, shown particularly in Figs. 4, 11 and 12. The rotation of the shaft 9 oscillates the bracket 118, the arm 115, and the shaft 100 in a manner previously described. Secured to the collar 114 is an arm 116 which is oscillated simultaneously therewith. This arm 116 has adjustably secured thereto by a bolt 177, a link 178 which is pivotally mounted upon the bolt 177. The link 178 extends downwardly and is pivotally connected at its lower end to an arm 179 free to oscillate upon the shaft 119. The pivot pin 180 to which the lower end of the arm 178 is secured, also carries a pawl 181 and a leaf spring 182 is secured to the arm 179 for resiliently pressing the point of the pawl 181 into contact with a ratchet wheel 183 loosely mounted on the shaft 119. This ratchet wheel 183 (as shown in Fig. 12) has a pinion 184 secured thereto which meshes with a pinion 185 carried on the end of the lower feed shaft 15. By this means rotation of the shaft 9 will impart a step by step movement to the ratchet wheel 183 which is transmitted to the feed shaft 15. This movement is of course much slower than that imparted to the shaft 15 by the train of gears shown in Fig. 3 and the amount of movement imparted to the shaft by each oscillation of the arm 116 may be regulated by adjusting the bolt 177 upon this arm. This mechanism is not detached during the envelop addressing operation since the ratchet wheel 183 permits of a more rapid movement of the shaft 15 than that imparted by the ratchet wheel. without interfering with the mechanism just described.

For winding up proof paper that has passed through the machine and received the proof of the addresses, the proof spindle 171 is provided as shown in Figs. 2 and 10. A key 190 coöperates with the proof spindle 171 for holding the end of the proof paper and the spindle is provided with a flange 191 for keeping the edge of the paper straight. The spindle is driven by a pulley 192 which has frictional contact therewith sufficient to drive the spindle under the light load produced by simply winding the paper on the spindle. The frictional contact, however, is not sufficient to draw the paper forwardly between the feed rolls. By this means the paper is kept sufficiently tight for proper winding while the speed at which it is fed is controlled by the feed rolls. After a proof of a complete set of printing plates has been made, it is desirable to have the proof paper wound in the right direction to exhibit the names printed thereon in the same order in which they were originally printed. Since in the original winding of the paper the first names were wound on the interior of the spool, it is necessary to re-wind the paper in order that the names may occur in proper order. For this purpose an additional spindle 193 is provided to which the last end of the proof paper is attached and the paper rewound upon this spindle and from the spindle 171. After this re-winding, it is removed from the spindle 193 and is ready for inspection. The pulley 192 is driven by a belt 194 which passes over a pulley 195 secured to the main drive shaft 9. For rewinding, a belt is arranged to connect a pulley 196 secured to the spindle 193 with a pulley 197 carried on the motor shaft adjacent the main motor pulley 3. During the rewinding, the belt 4 may be removed to prevent operation of the entire machine.

It is thought that the process of taking proof will be apparent from the description of the apparatus and further explanation of this process is unnecessary.

What I claim is:

1. In a device of the character described, a plurality of paper feeding belts, means for feeding cards or envelops to said belts, a runway arranged across the path of movement of said belts, means for supplying printing plates to said runway and moving said plates intermittently therein, means for intercepting the movement of the papers carried by said belts when adjacent said runway, and means for making impressions of the characters upon said printing plates on said papers while their movement is so intercepted.

2. In a device of the character described, two pairs of paper feeding belts having adjacent runs thereof moving in contact with one another, said pairs being spaced apart, means for supplying cards or envelops to said belts so that the ends thereof are held between the adjacent runs of the pairs, a runway extending across the path of movement of the papers carried by said belts, means for supplying printing plates to said runway and intermittently moving said plates therein, means for checking the movement of the papers carried by said belts while in position adjacent said runway, and means for making an impression of the characters carried by said printing plates upon said papers while said papers are so intercepted.

3. In a device of the character described, continuously moving paper feeding mechanisms, a guideway crossing the path of movement of the papers carried by said mechanism, means for supplying printing plates to said guideway and moving said plates intermittently in continuous succession along said guideway in a manner to permit each plate to come to rest for a period adjacent the path of movement of said paper feeding mechanism, means for intercepting the movement of paper carried by said paper feeding mechanism while said paper is adjacent said guideway and during the period of rest of the printing plates in said guideway, and means for taking an impression of the characters carried by each of said printing plates upon a paper carried by said paper feeding mechanism while said printing plate and said paper are at rest adjacent to one another.

4. In a device of the character described, two pairs of endless belts spaced apart from one another, two belts of each pair having adjacent runs adapted to move in contact with one another, means for periodically feeding pieces of paper to said belts in position to have the end portions thereof engaged by the contacting runs of said pairs of belts with the central portions free from said belts, a guideway arranged across the path of movement of the papers carried by said belts, means for intermittently feeding printing plates along said guideway in a manner to bring each plate to rest for an interval when adjacent the path of movement of the papers carried by said belts, means for intercepting the movement of the papers carried by said belts while adjacent the printing plate guideway, and means for transferring an impression from each printing plate while at rest adjacent the path of movement of said paper feeding belts, to a piece of paper carried by said belts and while the movement of said paper is intercepted.

5. In an addressing machine, mechanism for printing a series of different addresses, means for feeding separate sheets of paper to said printing mechanism one for each address printed, and means operable for independently feeding a continuous proof sheet to said mechanism to receive all of said addresses.

6. In an addressing machine, an intermittently operating printing device, means for feeding separate sheets of paper in succession to said printing device, and means for feeding a continuous strip of paper to said printing device.

7. In an addressing machine, an intermittently operating printing device, means for feeding a different printing plate to said printing device for each operation thereof, means for feeding a different sheet of paper to said printing device for each operation thereof, and means for feeding a continuous strip of paper to said printing device.

8. In an addressing machine, an intermittently operating printing device, means for changing the matter printed by said printing device for each operation of said device, means for feeding a separate card to said printing device for each operation thereof, and means for feeding a continuous proof strip to said printing device prior to the feeding of a series of separate sheets of paper thereto.

9. In an addressing machine, an intermittently operating printing device including means for printing a series of addresses upon separate cards or envelops, and mechanism for causing said device to print said same series of addresses upon a continuous proof sheet prior to the printing of said addresses upon said cards.

10. In an addressing machine, an intermittently operating printing device, means for feeding a series of printing plates having different addresses thereon, to said printing device, means for feeding separate pieces of paper to said printing device to receive the addresses on said printing plates, and means for feeding a continuous proof strip to said printing device for receiving the addresses on all of said printing plates prior to the printing of said addresses on said separate pieces of paper.

11. In an addressing machine, an intermittently operating printing device, means for feeding separate sheets of paper to said printing device, and means for feeding a continuous proof sheet to said printing device at a slower speed than that by which said separate sheets of paper are fed to said printing device.

12. In an addressing machine, a printing device means for alternatively feeding separate sheets of paper and a continuous strip of paper to said printing device, and means for driving said feeding means at a more rapid rate relatively to said printing device during the feeding of said separate sheets of paper than the rate at which said feeding means is driven during the feeding of said continuous strip.

13. In an addressing machine, a printing device, a pair of rollers for feeding paper to said printing device, mechanism for alternatively feeding separate sheets of paper and a continuous strip to said rollers, a train of gears for driving said rollers, ratchet mechanism for driving said rollers and means for disconnecting said train of gears from said rollers, whereby said rollers will be driven by said ratchet mechanism at a different rate of speed from that imparted to said rollers by said train of gears.

14. In an addressing machine, a printing device, mechanism for feeding paper to said printing device, gearing for operating said feeding mechanism at a predetermined rate of speed relative to the movement of said printing device for feeding separate sheets of paper to said printing device, and ratchet mechanism for feeding a continuous strip of paper to said printing device at a slower rate of speed than that imparted by said gearing.

15. In an addressing machine, a printing device, means for feeding paper to said printing device, means for supplying separate cards one at a time to said paper feeding means, mechanism for operating said paper feeding means and said card supplying means, and means for simultaneously disconnecting said card supplying means from said operating means and changing the speed of said paper feeding means.

16. In an addressing machine, a printing device, means for feeding paper to said printing device, mechanism for supplying cards to said paper feeding means, a train of gears for driving said paper feeding means and said card supplying mechanism, ratchet mechanism for driving said paper feeding means, a source of power connected with said train of gears, and said ratchet mechanism, and means for disconnecting said train of gears from said source of power whereby said card supplying mechanism will be rendered inoperative and said paper feeding means will be driven through said ratchet mechanism.

17. In an addressing machine, a printing device, means for feeding paper to said printing device, a common source of power for said printing device and said paper feeding means, means for supplying separate pieces of paper to said paper feeding means, means for supplying a continuous strip of paper to said paper feeding means, a train of gearing for connecting said source of power with said paper feeding means and said means for supplying separate pieces of paper, a ratchet mechanism for connecting said paper feeding means with said source of power, and means for disconnecting said train of gears from said source of power when said continuous strip of paper is being fed by said paper feeding means whereby said means for supplying separate pieces of paper is rendered inoperative and said paper feeding means is rendered operative by said ratchet mechanism at a slower rate of speed than that imparted to it by said train of gears.

18. In an addressing machine, means for printing a series of addresses upon separate pieces of paper, and for printing the same series of addresses upon a continuous strip of paper prior to the printing of said addresses upon said separate pieces of paper, feeding mechanism for said separate pieces and continuous strip including means for feeding said continuous strip of paper to said printing device at a predetermined rate of speed, and a separate device for winding said continuous strip of paper while being fed by said paper feeding means.

19. In an addressing machine, a printing device for printing a series of addresses upon separate pieces of paper, feeding mechanism including means for feeding separate pieces and means for feeding a continuous strip of paper to said printing device, and means for winding said continuous strip of paper including a friction drive.

20. In an addressing machine, a printing device for printing a series of addresses in succession upon separate sheets of paper, mechanism for feeding sheets in succession to said printing device and for feeding a continuous strip of paper to said printing device for taking proof of said addresses prior to the printing thereof upon said separate sheets of paper, and a device for winding said continuous proof strip, said winding device including driving mechanism having a frictional connection with a source of power, whereby said proof strip may be wound upon its spool without interfering with the speed at which it is fed to said printing device.

21. In an addressing machine, a device for printing a series of addresses upon separate sheets of paper in a predetermined order, means for printing said addresses upon a continuous strip of paper in the same order in which they are printed on said separate sheets of paper, means for winding said continuous strip of paper and means for rewinding said continuous strip of paper whereby said addresses will appear upon the final roll in the same order in which they are printed upon said separate sheets of paper.

22. In an addressing machine, a continuously operating drive shaft, a pair of reciprocating bars operated by said drive shaft, a guideway, means operated by one of said bars for feeding printing plates along said guideway, mechanism for feeding a ribbon in position to coöperate with said printing plates in said guideway, means operated by said reciprocating rod for driving said ribbon feeding means, an impression foot, and means operated by the other reciprocating rod for moving said impression foot into and out of position to coöperate with said printing plates and said ribbon for making impressions of the matter carried by said printing plates.

23. In an addressing machine, means for holding a character bearing device, means for positioning an impression ribbon adjacent said character-bearing device, means for feeding paper past said character-bearing device and impression ribbon, a resilient guide plate for holding said paper from contacting with said ribbon as it is fed to position adjacent said character bearing device, and an impression foot for pressing said paper against said ribbon.

24. In an addressing machine, a guideway, a magazine for supplying printing plates to said guideway, an intermittently operating device for periodically extracting printing plates from said magazine and moving said plates forwardly in said guideway, an impression ribbon, means for feeding said impression ribbon transversely of said guideway, mechanism for feeding paper transversely of said guideway, a paper holding magazine, means for periodically moving papers from said paper magazine to said paper feeding mechanism, an impression foot for pressing said papers, said impression ribbon and said printing plates into operative relation with one another to transfer an impression from said printing plates to said papers, means for receiving said printing plates from said guideway and holding them in fixed relation with one another while they are returned to said first-mentioned magazine, and means for driving all of said mechanisms in timed relation with one another.

25. In an addressing machine, printing mechanism, and means separately operable for feeding various styles of impression receiving means to said printing mechanism at the will of the operator.

26. In an addressing machine, printing mechanism, and means separately operable at the will of the operator for feeding various styles of separate impression receiving means or continuous impression receiving means to said printing mechanism.

27. In an addressing machine, printing mechanism and means separably operable for feeding cards, envelops, or a continuous paper strip into position to receive the impressions of said printing mechanism.

28. In an addressing machine, printing mechanism, means for feeding paper to said printing mechanism, and means separately operable for supplying cards, envelops or a continuous paper strip to said feeding means.

29. In an addressing machine, mechanism for printing, in succession, a series of addresses, means adjustable for either cards or envelops for supplying to said printing mechanism a separate paper for each address of said series, and independently operable means for feeding a continuous paper strip to said printing mechanism.

30. In an addressing machine, mechanism for printing a series of addresses on separate sheets of paper, means adjustable for either cards or envelops for supplying papers to said printing mechanism, and means for supplying a continuous paper strip to said printing mechanism to receive proof of the addresses printed.

31. In an addressing machine, a printing device, means for supplying successively to said printing device printing plates having addresses thereon, paper feeding mechanism for said printing device, means adjustable for either cards or envelops for supplying a separate paper to said paper feeding mechanism for each printing plate supplied to said printing device, and mechanism operable independently of said card and envelop supplying means for supplying a continuous paper strip to said paper feeding mechanism.

32. In combination, printing mechanism, means for feeding a series of printing plates to said mechanism, means for feeding a continuous proof strip to said printing mechanism, said printing plate feeding mechanism being operable to repeat the feeding of a series of plates to said printing mechanism, and means for feeding separate sheets to said printing mechanism one for each printing plate fed thereto during a second feeding of said printing plates.

In testimony whereof I have signed my name to this specification, in the presence of two subscribing witnesses, on this 20th day of October, A. D. 1915.

JOSEPH TOMLINSON,

Witnesses:
A. J. CRANE,
CHARLES H. SEEM.